United States Patent [19]
Weinhold

[11] 3,937,498
[45] Feb. 10, 1976

[54] HOSE COUPLING
[76] Inventor: Karl Weinhold, IM Jagdfeld 43, 4040 Neuss, Germany
[22] Filed: June 22, 1973
[21] Appl. No.: 372,754

[30] Foreign Application Priority Data
June 22, 1972 Germany............................ 2230463

[52] U.S. Cl............................ 285/243; 285/137 R
[51] Int. Cl.............................................. F16l 39/02
[58] Field of Search........ 285/242, 243, 137 R, 312,
285/320, 326, 259, 252, 67; 24/273, 81 CC,
263 LL, 279

[56] References Cited
UNITED STATES PATENTS

| 360,924 | 4/1887 | Solano | 24/273 |
|---|---|---|---|
| 1,659,196 | 2/1928 | Fulton | 24/279 |
| 2,725,246 | 11/1955 | Weinhold | 285/252 |
| 2,877,028 | 3/1959 | Knight | 285/137 R |
| 3,125,359 | 3/1964 | Charles | 285/137 R |
| 3,771,818 | 11/1973 | Weinhold | 285/242 |

FOREIGN PATENTS OR APPLICATIONS

| 1,058,059 | 2/1967 | United Kingdom | 285/243 |
| 1,425,581 | 11/1968 | Germany | 285/243 |

Primary Examiner—Werner H. Schroeder
Assistant Examiner—Peter Nerbun
Attorney, Agent, or Firm—Michael J. Striker

[57] ABSTRACT

A casing has a pair of shell sections which are hingedly movable relative to one another between an open and a closed position. A pair of elongated nozzles extends longitudinally of a parting line of the shell sections and is arranged side by side in the casing. A mounting member is provided in the shell sections extending normal to the elongation of the nozzles and connecting the latter. The shell sections are formed with recesses into which portions of the mounting member extend. Arcuate flanges are provided on the shell sections and are so configurated as to be concentric with the respective nozzles when the shell sections are in closed position, and to press a hose slipped onto such nozzle against the same. A tensioning arrangement is provided for drawing the shell sections together when they are in closed position.

11 Claims, 4 Drawing Figures

HOSE COUPLING

BACKGROUND OF THE INVENTION

The present invention relates generally to a coupling, and in particular to a hose coupling.

It is already known to provide hose couplings having a housing composed of two hingedly connected shell sections which, when they are in closed position, can be pressed together by a tensioning arrangement. The housing accommodates a nozzle onto which an end of a hose can be slipped, and the nozzle is provided with a shoulder. In the region of the shoulder, flanges of the shell sections press against the hose, urging the same into tight contact with the nozzle to prevent it from slipping off the same. The nozzle is mounted in the housing composed of the shell sections by a mounting member which has the additional purpose of maintaining a precise axial positioning of the nozzle relative to the flanges which are to engage the hose, so that the flanges will always press the hose against the nozzle at the most advantageous location, namely adjacent to the shoulder mentioned earlier.

The prior-art constructions of this type are suitable only for connecting a single hose which can carry a single flowable medium. However, they are double or twin hoses which carry two different flowable media in parallelism. The external appearance of these twin hoses does not necessarily indicate the duality of their internal construction, because usually the two hoses are integrated into a single element. Interiorly, however, they have two entirely separate passages of circular cross-section. This type of hose is for instance used in the welding applications for transporting two fluids simultaneously.

Heretofore the connection of such a twin hose to a rigid hose coupling, or the connection of the ends of two twin hoses with one another, was possible only by cutting the twin hose apart at the free end thereof, so that the two portions, each provided with one of the internal passages, could be physically moved apart to permit the connection to be established. In many instances this is not at all possible, and even where the possibility exists such a solution is, of course, most unsatisfactory. This is especially true because once such a cut has been made, a running-along of the cut, that is a separation of the two individual passages to an extent which is greater in axial direction of the twin hose than is desired, cannot be precluded.

SUMMARY OF THE INVENTION

It is, accordingly, a general object of the present invention to overcome the disadvantages of the prior art.

More particularly, it is an object of the invention to provide a hose coupling which avoids the disadvantages mentioned above.

Still more particularly, it is an object of the invention to provide such an improved hose coupling which is simple and reliable in its operation, and relatively inexpensive to produce.

In keeping with these objects, and with others which will become apparent hereafter, one feature of the invention resides in a hose coupling which, briefly stated, comprises a casing having a pair of shell sections which are hingedly movable relative to one another between an open and a closed position. A pair of elongated nozzles is provided, extending longitudinally of a parting line of the shell sections and being arranged in side-by-side relationship. A mounting member is provided in the shell sections, extending normal to the elongation of the nozzles and connecting the latter. The shell sections are provided with recesses into which portions of the mounting member extend. Arcuate flanges are provided on the shell sections and are so configurated as to be concentric with the respective nozzles when the shell sections are in the closed position, and to press a hose slipped over such nozzle against the same. Means is provided for drawing the shell sections together when they are in the closed position, so as to press the flanges against the hose.

Constructed in accordance with the invention as outlined above, the hose coupling has an approximately elliptical configuration and the parting line constitutes the longer axis of the ellipse, whereas the portions of the mounting member which engage the shell sections extend in the direction of the shorter axis of the ellipse. The abutment faces of the flanges are so configurated that they are largely accommodated to the cross-sectional configuration of a dual or twin hose.

With this construction it is possible to connect twin hoses to the hose coupling without having to separate the two hoses of the unit, or without having to inflict any other damage on the same, as long as the transverse spacing between the twin hoses is the same as that between the nozzles which are arranged in side-by-side relationship. The transverse spacing of such twin hoses is standardized, so that the hose coupling can readily be manufactured for use with different types of twin hoses.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
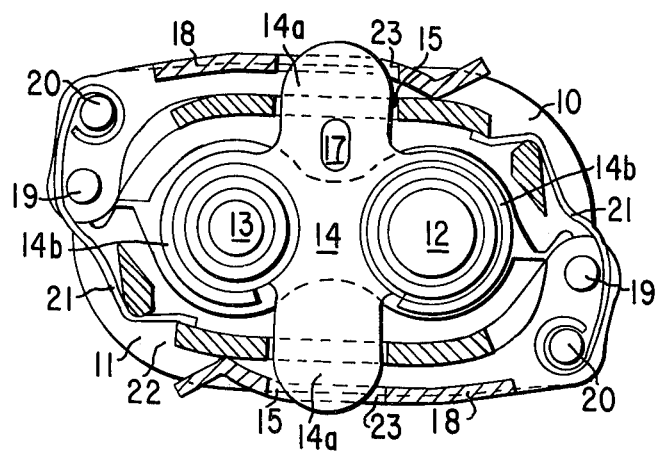
FIG. 1 is a cross-sectional view through an embodiment of the invention.

Discussing now the drawing in detail, which illustrates in FIGS. 1–4 a single exemplary embodiment of the invention, it will be seen that the hose coupling has a casing utlizing two shell sections 10 and 11. In the illustrated embodiment these shell sections are connected at their respective opposite ends by tension-lever arrangements. Two nozzles 12 and 13 are connected to a mounting member 14; they are located in side-by-side relationship.

The shell sections 10 and 11 each have inwardly extending radial flanges 10a and 11a whose position in axial direction of the casing is so selected that when the shell sections are in closed position they will press against the exterior of the twin hose (not shown) which has been slipped onto the nozzles 12 and 13, at a slight distance from the shoulders 12a and 13a of these nozzles. The flanges 10a and 11a are arcuately configurated, having portions which are approximately concentric to the nozzles 12 and 13 and a center portion which extends into the space between the nozzles 12 and 13. The configuration of these arcuate flanges is such that it is accommodated to the external contours of the conventional twin houses. Slot-shaped recesses or cutouts 15 are provided in the shell sections 10 and 11, and webs 14a of the mounting member 14 extend through these cutouts 15. Arms 14b of the mounting member 14 retain the nozzles 12 and 13 which are embraced by them.

In that part of the flanges 10a which extends into the space between the nozzles 12 and 13, bores or holes 16 are provided which are in axial alignment with an elongated slot 17 of the member 14 and through which a pin (not illustrated) is extended. This assures that, although the member 14 and the shell section 10 can be shifted radially relative to one another, a reliable connection between them is established and maintained at all times. The tension lever 18 of the one tension lever arrangement is pivoted to the shell section 10 by means of a pin or bolt 19. A further bolt 20 connects a spring 21 to the lever 18, the other end of which spring extends into and is retained in a recess 22 of the shell section 11. The configuration of the end which extends into the recess 22 is so selected that even when the tension lever arrangement is in unstressed condition, the spring will not become disengaged from the recess 22. A cutout 23 is provided in the tension lever 18 which registers with the cutout 15 of the shell section 10 and through which one web 14a of the member 14 also extends. The same is true of the opposite tension lever arrangement which engages the opposite ends of the shell sections 10 and 11 and whose components are identified with the same reference numerals as above.

Figure 2:
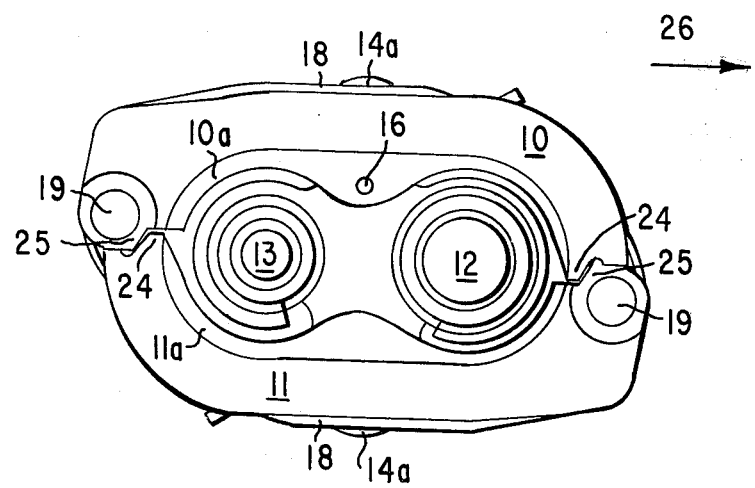
FIG. 2 is an end view of the embodiment in FIG. 1.
Figure 3:
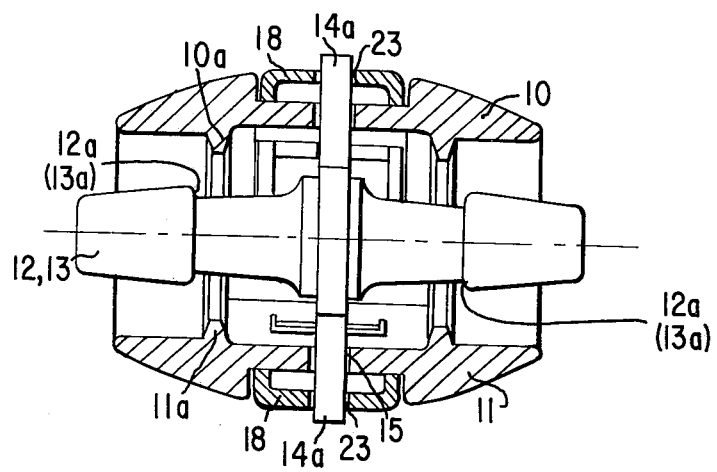
FIG. 3 is a longitudinal section through the embodiment in FIG. 1.
Figure 4:
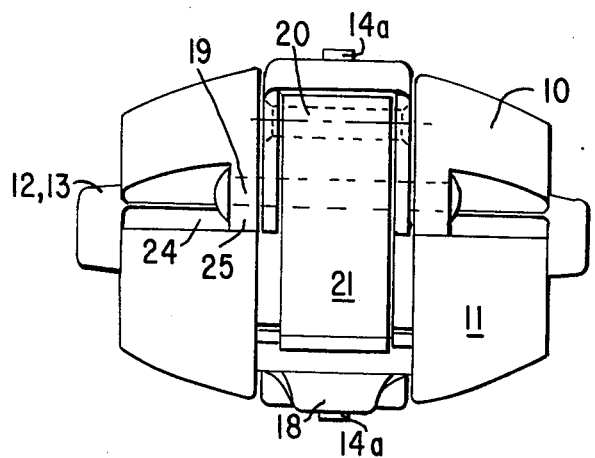
FIG. 4 is a side view of the embodiment in FIG. 1.

FIG. 2 shows that the flange 10a of the shell section 10 is provided at the right-hand end of the latter with an inner extension 24 provided with an abutment surface which, seen in radially outward direction, extends behind a portion 25 formed on the flange 11a or on the shell section 11 and engages an associated abutment surface thereof. At the left side of FIG. 2 the arrangement is the same, so that a similar extension 24 is provided, however here on the shell section 11, which engages behind a portion 25 on the shell section 10 or the flange 10a thereof. This arrangement assures that the shell section 10 cannot shift relative to the shell section 11 in the direction of the arrow 26 when the shell sections are in closed position. This is important because such a shifting might otherwise be caused by the forces exerted by the tension lever arrangements. The extensions 24 are located in the same plane as their respectively associated flanges 10a or 11a, so that the manufacture is simplified.

When a twin hose is to be coupled with the novel coupling, both of the tension lever arrangements are released and the shell sections 10 and 11 move apart approximately uniformly in the directions of the webs 14a, but keep being connected at both ends by the springs 21. After the free end of the twin hose has been pushed onto the two nozzles, the tension lever arrangements are operated and the casing is closed again.

It is of course also possible to use, instead of nozzles 12 and 13 which each extend beyond the opposite sides of the member 14, nozzles which extend only from one end of the casing to the member 14. At the other side of the member 14 there may then be provided a cylindrical tubular portion communicating with the respective nozzle and onto which a rigid tube can be pushed which is provided with an annular flange that can be engaged by the flanges of the shell sections when the casing is closed, to prevent undesired pulling-off of the tube from the respective tubular connector.

It will be clear that in the arrangement according to the present invention the flanges 10a, 11a will always press against the twin hose in the region adjacent the respective shoulder 12a, 13a, because relative axial displacement of the nozzles and the shell sections is impossible. This is, of course, the most advantageous region for such engagement where the maximum pressure can be exerted upon the twin hose. On the other hand, a transverse adjustment is possible due to the fact that the member 14 is shiftable transversely relative to the shell section 10.

The webs 14a are advantageously so long that the guidance which is afforded to the member 14 by the shell sections when they are in closed position, will also remain effective when the shell sections are in open position. Of course, the configuration of the webs 14a could be different from what has been illustrated, and so could be the configuration of the recesses or cutouts into which they extend. The illustrated possibility has the advantage that a tilting and binding of the member 14 with the nozzles relative to the shell sections can be avoided, at least to a significant extent.

The webs 14a could be made shorter than illustrated, and the cutout in the tension lever 18 could be omitted. On the other hand, the pin could also be omitted if the webs are present as has been illustrated. The provision of the pin of course assures that a certain radial adjustment of the member 14 relative to the shell sections is possible, but an undesired complete separation from them is impossible.

If desired, only a single tension lever arrangement could be provided at one end of the casing. In that case, a pivot pin could be provided at the other end of the casing, extending in known manner through both of the shell sections to hingedly connect them together. The angle, through which the shell sections must be able to move in order to open sufficiently for admission of the free end of the twin hose, will of course depend upon the exterior diameter of the respective twin hose. Also, an excessive angle must be avoided because this makes the operation of the device more difficult and brings with it other disadvantages.

It is also possible to connect the shell sections at one end by providing a pivot bolt or pin on one of the shell sections, and providing the other shell section with a cooperating member extending through an opening and having at the inner side of the shell section an aperture through which the pin extends, and at the outer side a threaded portion onto which a nut is threaded. The member can of course also be retained in the hole in other ways rather than by being threaded and utilizing a nut. If a nut is used, however, this is advantageous because the position of the shell sections relative to one another, especially in the region of the other end where the tension lever arrangement is provided, can be adjusted by requisite turning of the nut. This also permits a desired opening angle to be set, and assures other advantages, for instance if for release or final connection (before the tension lever is opened or after it is moved to tensioning position) the nut is to be turned to facilitate such operations.

If two tension lever arrangements are used, as in the illustrated embodiment, this has the advantage, inter alia, that the configuration of the two shell sections can be identical. Moreover, the elimination of separate hinge means of course permits a less expensive construction.

It will be understood that each of the elements described above, or two or more together, may also find a useful application in other types of constructions differing from the types described above.

While the invention has been illustrated and described as embodied in a hose coupling, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, accordingly, such adaptations should and are intended to be comprehended within the meaning and range of equivalence of the following claims.

What is claimed as new and desired to be protected by Letters Patent is set forth in the appended

1. A twin hose coupling, comprising a pair of elongated nozzles arranged side-by-side and having substantially parallel longitudinal axes; a casing including a pair of shell sections hingedly movable relative to one another between an open position and a closed position in which said nozzles are substantially coaxially accommodated in said casing, and each provided with a substantially centrally located recess; a mounting member in said casing extending normal to said axes and into said recesses and connecting said nozzles to one another; arcuate flanges provided on said shell sections and being coaxial with the respective nozzles when said shell sections are in said closed position, and to press a twin hose slipped over said nozzles against the same; and tension lever latch means provided at one circumferential end of said casing and having a tension lever which abuts one of said shell sections; and further comprising an additional tension lever latch provided at the opposite circumferential end of said casing and having an additional tension lever which abuts the other of said shell sections 9, means for drawing said shell sections together in said closed position so as to clamp the twin hose between said flanges and said nozzles.

2. A coupling as defined in claim 1, wherein said mounting member is supported in said recesses for displacement substantially perpendicularly to said axes and radially of said casing.

3. A coupling as defined in claim 2, said mounting member having web-shaped portions extending into said recesses and being received therein even when said shell sections are in said open position.

4. A coupling as defined in claim 1, wherein said mounting member is provided with an elongated slot-shaped hole the elongation of which extends substantially normal to said axes; wherein said casing is provided with a pair of openings axially aligned with one another and with said hole; and further comprising a retaining pin extending through said openings and said hole for limiting the extent of movement of said mounting member with respect to said shell sections.

5. A coupling as defined in claim 1, wherein both of said shell sections are of identical shape.

6. A coupling as defined in claim 1, wherein said flanges of the respective shell sections have abutment surfaces which engage one another when said shell sections are in said closed position.

7. A coupling as defined in claim 6, wherein the flanges of each shell section are provided at one circumferential end of said casing with an inner circumferentially elongated extension, and the respective other shell section is provided with an abutment which engages said extension from the exterior of said casing.

8. A hose coupling, comprising a casing including a pair of shell sections which are hingedly movable relative to one another between an open and a closed position; a pair of elongated nozzles extending longitudinally of a parting line of said shell sections and arranged side-by-side; a mounting member in said shell sections, extending normal to the elongation of said nozzles and connecting the latter; a pair of recesses in said shell sections in which said mounting member is supported for displacement radially of said casing; arcuate flanges provided on said shell sections and being configurated so as to be concentric with the respective nozzles when said shell sections are in said closed position, and to press a hose slipped over such nozzles against the same; and means for drawing said shell sections together so as to press said flanges against said hose, and including a tensioning lever provided with a cutout and abutting one of said shell sections when the latter are in said closed position thereof, said mounting member partially extending into said cutout.

9. A coupling as defined in claim 8, said casing comprising a pivot pin pivotally connecting said shell sections for said hinged movement thereof.

10. A coupling as defined in claim 8, said casing comprising a pivot pin connected with one of said shell sections, and a cooperating member anchored in a hole of the other shell section and having an aperture through which said pivot pin extends.

11. A coupling as defined in claim 10, wherein said cooperating member has one portion located outside said other shell section and provided with said aperture, and another threaded portion located inside said other shell section; and further comprising a nut threaded onto said other portion.

* * * * *